(12) United States Patent
Rothamel

(10) Patent No.: US 6,752,016 B2
(45) Date of Patent: Jun. 22, 2004

(54) METHOD AND APPARATUS FOR BALANCING A MOTOR VEHICLE WHEEL

(75) Inventor: Karl Rothamel, Ober-Ramstadt (DE)

(73) Assignee: Snap-On Equipment GmbH (DE)

(*) Notice: Subject to any disclaimer, the term of this patent is extended or adjusted under 35 U.S.C. 154(b) by 0 days.

(21) Appl. No.: 10/351,911

(22) Filed: Jan. 23, 2003

(65) Prior Publication Data
US 2003/0167840 A1 Sep. 11, 2003

(30) Foreign Application Priority Data
Jan. 25, 2002 (DE) .......................... 102 02 898

(51) Int. Cl.$^7$ ............................ G01M 1/16; G01M 1/00

(52) U.S. Cl. ........................................... 73/462; 73/487

(58) Field of Search ................. 73/487, 458; 701/80, 701/83–86, 90

(56) References Cited

U.S. PATENT DOCUMENTS

2002/0000121 A1 * 1/2002 Carter et al. ................. 73/462
2003/0101813 A1 * 6/2003 Rothamel et al. ............ 73/487

FOREIGN PATENT DOCUMENTS

DE   198 44 975 C 2    3/2000
DE       10000235      7/2001

* cited by examiner

Primary Examiner—Helen Kwok
(74) Attorney, Agent, or Firm—Ostrolenk, Faber, Gerb & Soffen, LLP

(57) ABSTRACT

A method and an apparatus for balancing a motor vehicle wheel, in which the torque during acceleration to the measurement rotation speed and during braking after carrying out the measurement run is adjusted as a function of the wheel type to be balanced, such that the rotationally fixed connection between the main shaft and the motor vehicle wheel is maintained even when the driving prestressing force between the main shaft and the motor vehicle wheel is reduced.

11 Claims, 1 Drawing Sheet

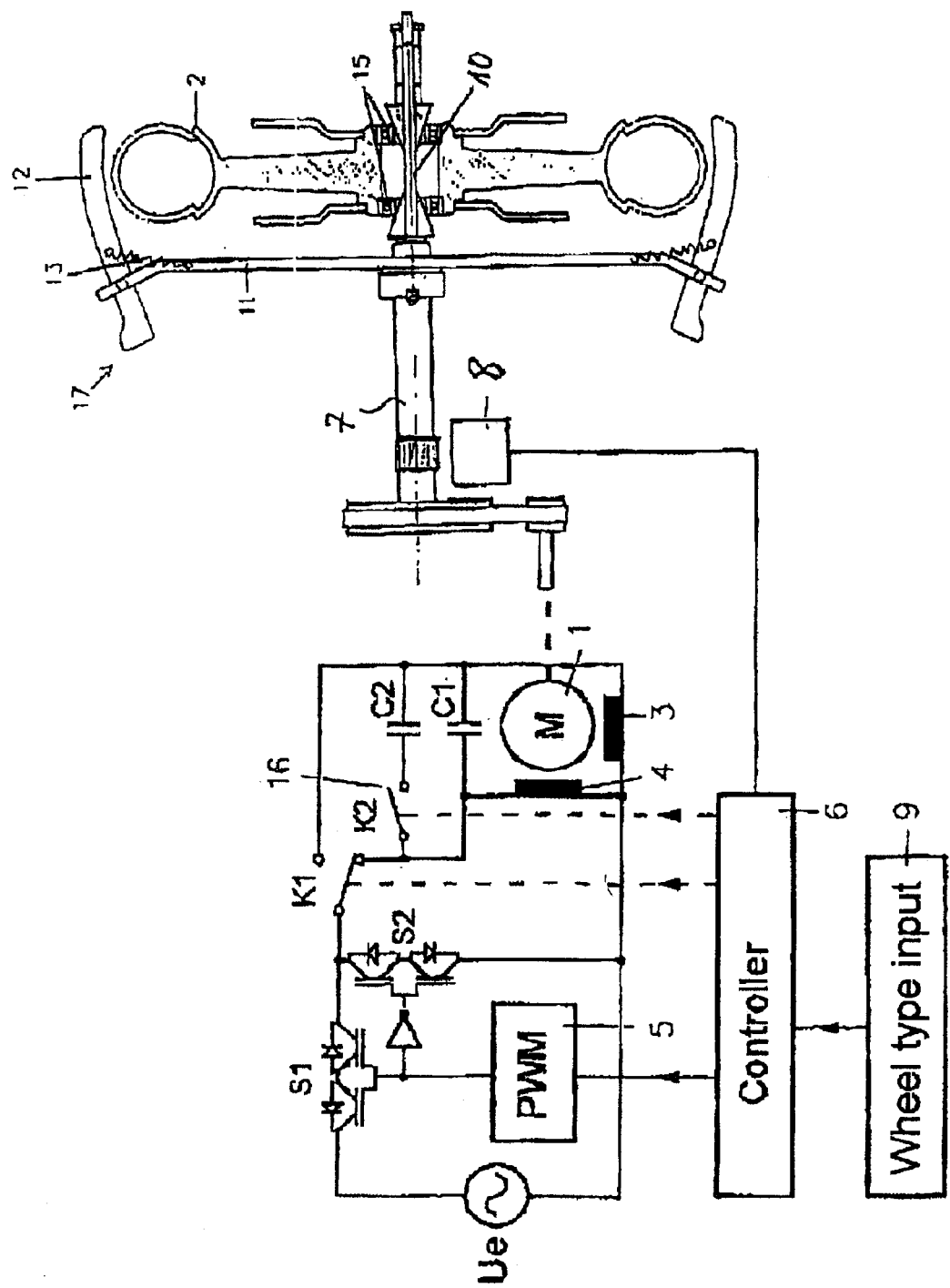

METHOD AND APPARATUS FOR BALANCING A MOTOR VEHICLE WHEEL

DESCRIPTION

The invention relates to a method and an apparatus for balancing a motor vehicle wheel, in which method the wheel which is mounted on a main shaft of a balancing machine by means of a driving prestressing force is accelerated by means of an AC motor to the measurement rotation speed by a specific drive torque, and is braked by a braking torque after carrying out the measurement run.

PRIOR ART

In the case of a method and an apparatus of this type which are known from DE 100 00 235 A1, the motor vehicle wheel is accelerated to the measurement rotation speed by the drive torque that is produced by the AC motor. On reaching the measurement rotation speed, a reduced supply current is supplied to the windings of the motor during the measurement run, which essentially compensates for any drop in rotation speed caused by friction and air drag, so that the unbalanced measurement run is carried out at the desired measurement rotation speed. After completion of the measurement run, the motor vehicle wheel is braked, in which case the AC motor can supply the necessary braking torque. In the known apparatus, the AC motor is in the form of a single-phase AC motor.

In order to keep the cycle time which is required for acceleration of the balancing machine to the measurement rotation speed, for the measurement run and for braking as short as possible in order to achieve economical utilization of the balancing machine, the drive motor, in particular a single-phase AC motor, for driving the main shaft is designed to produce an adequate torque, for example in the order of magnitude of approximately 24 Nm. In order to transmit the high torque from the main shaft to the motor vehicle wheel, this motor vehicle wheel must be mounted on the main shaft in a rotationally fixed manner by means of an appropriately high driving prestressing force. Otherwise, there is a risk of the motor vehicle wheel sliding on the main shaft during acceleration to the measurement rotation speed and/or during braking after carrying out the measurement run. However, for accurate compensation for any unbalance, the motor vehicle wheel must remain connected to the main shaft in a rotationally fixed manner and must maintain the same rotation angle position on the main shaft. When balancing wheels with designer rims, in particular composed of light alloy, there is a risk of the wheel disks being damaged by the high clamping forces which are required to mount the motor vehicle wheel on the main shaft. When balancing motor cycle wheels, it is necessary to press the clamping lever(s) (which is/are used to produce the driving prestressing force) onto the tire with a high contact pressure force. This results in a risk of bending of the clamping shaft on which the motor cycle wheel is rotated during the unbalanced measurement run, and hence of displacement of the wheel center point. Exact balancing of the motor cycle wheel is then impossible.

OBJECT OF THE INVENTION

The object of the invention is therefore to provide a method and an apparatus of the type mentioned initially which make it possible to carry out an accurate unbalanced measurement on different wheel types without complex changes to the measurement arrangement.

In the case of the method, this object is achieved according to the invention by the distinguishing features of patent claim 1, and in the case of the apparatus, it is achieved by the distinguishing features of patent claim 3.

In contrast to the conventional operation of balancing machines, in the case of the invention, the torque which is produced by the drive motor during acceleration to the measurement rotation speed is influenced as a function of the type of wheel which is mounted on the main shaft. In the case of motor vehicle wheels whose wheel disks are composed of heavy material, for example steel, the drive motor may produce a high torque, for example of approximately 24 Nm, in order to reach the measurement rotation speed as quickly as possible. A high braking torque may also be produced during braking, in order to bring the motor vehicle wheel to the desired compensation position in the shortest possible time after carrying out the measurement run. In the case of motor vehicle wheels with wheel disks made of light alloy, and in particular with designer rims, the torque which is produced by the drive motor is reduced to 50%, 25% or even less. The torque is also reduced for motor cycle wheels in order that the prestressing force by means of which the clamping lever of the driving apparatus is pressed onto the tire can be reduced sufficiently to avoid bending of the clamping shaft on which the motor cycle wheel revolves during the unbalanced measurement run.

During balancing of a motor vehicle wheel, the torque during acceleration to the measurement rotation speed and the braking torque during braking after carrying out the measurement run can advantageously be adjusted as a function of the type of wheel to be balanced, such that the rotationally fixed connection between the main shaft and the motor vehicle wheel is maintained even when the driving prestressing force between the main shaft and the motor vehicle wheel is reduced.

Reducing the drive torque and braking torque makes it possible to connect motor vehicle wheels with wheel disks made of sensitive material, for example light alloy, and motor cycle wheels to the main shaft with a reduced prestressing or clamping force in a rotationally fixed manner without there being any risk of the motor vehicle wheel sliding, and hence of the measured value being corrupted.

EXAMPLES

The invention will be explained in more detail using an exemplary embodiment and with reference to the figure.

The FIGURE uses a block diagram to illustrate schematically a measurement arrangement and a drive arrangement for a wheel balancing machine.

The illustrated exemplary embodiment shows a main shaft 7 of a balancing machine which can be driven by an electric motor 1 via a transmission, for example belt drive. The electric motor is in the form of an AC motor, in particular a single-phase AC motor, as is known by way of example for a wheel balancing machine from DE 100 00 235 A1. A motor vehicle wheel 2 is clamped in a known manner onto the main shaft 7 of the balancing machine. The illustrated exemplary embodiment relates to a motor cycle wheel. In order to measure any unbalance, the main shaft 7 and the motor vehicle wheel 2 are driven by the electric motor 1 such that they accelerate to the measurement rotation speed. During the measurement run, forces which result from the rotor unbalance are measured on the main shaft 2 and are converted into unbalance compensation parameters related to compensation planes on the motor vehicle wheel 2. A suitable measurement arrangement is known, by way of example, from DE 198 44 975 A1. In order to control the power supply during acceleration, the balancing machine has an AC voltage controller which is controlled by pulse-width modulation (PWM) 5 and has a series switch S1 and a commutation switch S2, via which the stator windings 3, 4 of the electric motor 1 are supplied with electrical power. The rotation direction of the electric motor 1 is set by means of a changeover switch K1, which is preferably in the form of a relay. The switching position of the changeover switch K1 illustrated in the figure shows, by way of example, the forwards rotation direction, in which the motor vehicle wheel 2 is accelerated to the measurement rotation speed. A reactive device, in particular a capacitance, which is connected in series with the stator winding 3 in the figure, results in the two stator windings 3, 4 being supplied with the motor current with a phase difference of, in particular, 90°. The motor current is supplied from an AC voltage source Ue. Instead of one capacitor, two or more capacitors may be used to vary the capacitance and are connected to or disconnected from the motor circuit as a function of the rotation speed, as is described by way of example in DE 100 00 235 A1. In the illustrated exemplary embodiment, the capacitance in the auxiliary path is formed by two torque capacitors C1 and C2 which can be connected in parallel, with one of the two capacitors C1 always being connected in the auxiliary path and the other capacitor C1 always being disconnected, by means of a switch (K2) 16 as a function of the desired torque.

Both the series switch S1 and the commutation switch S2 are in the form of two back-to-back series-connected semiconductor switches. These semiconductor switches are preferably in the form of IGBTs. However, MOSFETs may also be used. The power semiconductor switches have an integrated back-to-back parallel-connected diode, so that if the polarity of the voltage across the respective semiconductor switch is negative, this diode carries current, and no electrical voltage can be produced. Since the semiconductor switches have to block AC voltage or have to carry alternating current during operation of the AC voltage controller, and the semiconductor switches block or pass through voltage of only one polarity, two semiconductor switches are in each case provided, connected back-to-back in series, both for the series switch S1 and for the commutation switch S2.

When the changeover switch K1 is in the switch position illustrated in the figure, the series switch S1 passes on the AC voltage from the AC voltage source Ue, for example the mains voltage, to the electric motor 1. The commutation switch S2 is driven by the pulse-width modulation (PWM) 5 such that it carries the current for the motor inductance when the series switch S1 is switched off (synchronous commutation). For this purpose, the two gates of the semiconductor switches which form the series switch S1, for example the two IGBTs, are driven in the opposite sense to the two gates of the semiconductor switches which form the commutation switch S2. This ensures that the control voltages which are applied from the pulse-width modulation 5 to the gates of the series switch S1 and of the commutation switch S2 are not supplied at the same time, but are supplied alternately or in opposite senses. The magnitude of the motor current which is supplied to the stator windings 3, 4 is governed by the duty ratio of the PWM signal. The clock frequency of the PWM signal is preferably modulated in the order of magnitude between 3 and 10 kHz.

The electric motor 1 produces an opposing torque in order to stop the rotor at a specific position, for example, the compensation rotation angle position, after the measurement run. To do this, the changeover switch K1 is moved to an appropriate switch position, for example, the switch position located at the top in the figure, as a function of the respective rotation direction of the motor vehicle wheel 2. In this switch position, the capacitance of the auxiliary path is connected in series with the stator winding 4. The switch S2 acts as the series switch, and the switch S1 as the commutation switch, in this motor braking mode. As during acceleration, the stator windings 3, 4 are supplied with alternating current via the AC voltage controller. In this case, an opposing torque is produced, and is used to brake the rotation of the motor vehicle wheel 2 and the main shaft 7. The braking process can be controlled by the operation of the pulse-width modulation 5 in such a way that the motor vehicle wheel 2 is stopped at the desired compensation rotation angle position. Furthermore, it is possible to fix the time at which the switch K1 switches to the motor braking mode such that, for a known braking effect which results from the torque produced by the electric motor 1, the rotor 2 is stopped at the compensation rotation angle position as a function of the instantaneous rotation speed.

In order to control the changeover switch K1, and the pulse-width modulation 5, a control device 6 may be provided which is connected to a scanning or sampling device 8, by means of which the respective rotation angle position of the main shaft 7 and hence of the motor vehicle wheel 2 and/or the rotation speed as well as the rotation direction are scanned or sampled.

When balancing a motor cycle wheel, the motor cycle wheel is mounted on a clamping shaft 10 in its own bearings 15. The clamping shaft 10 may be anchored in an axial hole in the main shaft 7, for example by means of a thread which engages on the main shaft 7, or may be provided on a driving device 17 which is connected to the main shaft 7 in a rotationally fixed manner. The driving device 17 has at least one essentially radially projecting driver lever 11, on which a clamping lever 12 is mounted such that it can pivot. The clamping lever 12 is pressed by means of a clamping spring 13, which acts between the driver lever 11 and the clamping lever 12, onto the circumferential surface of a tire 14 on the motor cycle wheel. The figure illustrates a driver device 17 which acts on the wheel at diametrically opposite points. A driver device 17 which acts on the motor cycle wheel on only one side may also be used.

The clamping shaft 10 is designed to be relatively thin, for matching to the hub diameter. However, the clamping spring 13 has to exert a sufficient clamping force on the clamping lever 12 in order to press the clamping lever 12 onto the surface of the tire 14 with an adequate prestressing force in order to avoid the wheel slipping during acceleration to the measurement rotation speed and during braking after the measurement run. If the clamping force of the clamping spring 13 is of an appropriate magnitude for a high drive torque or high braking torque, as is the case in conventional balancing machines, there is a risk of the relatively thin clamping shaft 10 being bent, so that the wheel center point is displaced with respect to the main shaft 7. A correct unbalanced measurement is then no longer possible.

In the case of motor vehicle wheels with wheel disks which have a sensitive surface, for example with designer rims, there is a risk of damage if the motor vehicle wheel is clamped onto the main shaft 7 at the center. Displacement of the wheel center point can also occur in this case if high clamping forces need to be used for an adequate driving force during acceleration.

In order to overcome the problem in the case of the invention, the torque that the electric motor supplies during acceleration to the measurement rotation speed and the torque which is used during braking of the main shaft after the measurement run are reduced sufficiently that reduced prestressing forces can be used for the rotationally fixed connection of the motor vehicle wheel to the main shaft 7 for the problematic types of wheel under discussion. These prestressing forces can be reduced sufficiently to avoid displacement, which would corrupt the unbalanced measurement, of the center point of the motor vehicle wheel 2 with respect to the main shaft 7 during acceleration and during braking.

In the illustrated exemplary embodiment, an input device 9 is provided for the respective wheel type, and is clamped onto the main shaft 7. The drive system, in particular the power supply circuit for the electric motor 1 for producing the appropriate supply current and hence the torque, is controlled as a function of this. According to the illustrated exemplary embodiment, the control device 6 to which the wheel type input information is passed is used to adjust the pulse-width modulation 5 for the AC voltage controller (S1, S2). Furthermore, the capacitance which can be set by the torque capacitors C1 and C2 in the respective auxiliary path can be adjusted additionally or on its own by opening or closing the switch 16, which is driven by the control device 6, during acceleration and/or during braking. If a number of torque capacitors are provided, one or more of these capacitors may be disconnected. This results in appropriate adjustment of the torque as a function of the type of wheel on the main shaft 7. The drive apparatus illustrated in the figure advantageously not only provides for the acceleration of the motor vehicle wheel 2 to the measurement rotation speed but also for the braking after the measurement run. As already explained, the changeover switch K1 is moved to the appropriate position for this purpose.

However, it is also possible to provide a separate braking apparatus whose braking torque is likewise adjusted and possibly reduced as a function of the wheel type.

The torque during acceleration to the measurement rotation speed and during braking after the measurement run may also be reduced or influenced by means of the apparatus which is described in DE 100 00 235 A1, with the control device that is used to carry out the torque adjustment being operated appropriately during acceleration and during braking as a function of the wheel type input.

LIST OF REFERENCE SYMBOLS

1 Electric motor (single-phase AC motor)
2 Rotor (motor vehicle wheel)
3 Stator winding
4 Stator winding
5 Pulse-width modulation
6 Control device
7 Main shaft
8 Scanning or sampling device
9 Input device for wheel types
10 Clamping shaft
11 Driver lever
12 Clamping lever
13 Clamping spring
14 Tire
15 Bearing
16 Switch K2
17 Driving device
S1 Series switch (or commutation switch)
S2 Commutation switch (or series switch)
K1 Changeover switch (relay)
C1 Torque capacitors
C2 Torque capacitors

What is claimed is:

1. A method for balancing a motor vehicle wheel, comprising:
   connecting the vehicle wheel in a rotationally fixed manner to a main shaft of a balancing machine;
   applying a drive torque to the vehicle wheel to accelerate the vehicle wheel to a measurement rotation speed;
   measuring imbalance forces of the vehicle wheel; and
   after measuring the imbalance forces, applying a braking torque to the vehicle wheel to brake the vehicle wheel;
   adjusting the drive torque and the braking torque as a function of a type of the vehicle wheel.

2. The method claim 1, wherein the drive torque and the braking torque are adjusted as a function of the type of wheel such that the connection between the vehicle wheel and the main shaft is maintained without displacement of a center point of the vehicle wheel with respect to the main shaft.

3. An apparatus to balance a vehicle wheel, comprising:
   a frame;
   a main shaft rotationally mounted to the frame;
   an electric motor to drive the main shaft;
   a power supply circuit to provide a motor supply current to the electric motor;
   a clamping device configured to produce a driving prestressing force to couple the vehicle wheel to the main shaft in a rotationally fixed manner; and
   an adjustment arrangement operable to adjust the motor supply current provided by the power supply circuit in accordance with a type of the vehicle wheel.

4. The apparatus of claim 3, wherein
   the power supply circuit is a phase shifted power supply circuit; and
   the electric motor is a single-phase AC motor including first and second stator windings, and including at least one torque capacitor connectable in series with one of the stator windings dependent upon a rotation direction of the vehicle wheel, the capacitor being connectable with the stator winding as a function of the type of the vehicle wheel.

5. The apparatus of claim 4, further comprising a changeover switch to connect the at least one torque capacitor in series with the stator winding.

6. The apparatus of claim 4, wherein the first and second stator windings are supplied with a 90° phase shifted current.

7. The apparatus of claim 3, wherein the vehicle wheel is a motorcycle wheel, the clamping device producing the driving prestressing force on the motorcycle wheel such that a center point of the motorcycle wheel is not displaced with respect to the main shaft;
   the motor being operable to selectively supply one of a driving torque and a braking torque to the vehicle wheel;
   the adjustment arrangement being further operable to adjust the supply current provided by the power supply circuit to the electric motor such that the motorcycle wheel remains rotationally fixed to the main shaft during application of the driving and braking torques.

8. An apparatus to balance a vehicle wheel, comprising:
   a frame;
   a main shaft rotationally mounted to the frame;
   an electric motor to drive the main shaft;
   a power supply circuit to provide a motor supply current to the electric motor;

a clamping device configured to produce a driving prestressing force to couple the vehicle wheel to the main shaft in a rotationally fixed manner; and an adjustment arrangement operable to adjust the motor supply current provided by the power supply circuit in accordance with a type of the vehicle wheel, wherein the electric motor is a single-phase AC motor; the power supply circuit includes a pulse-width modulation circuit operable to produce a pulse-width modulated signal as a function of the type of the vehicle wheel; and the power supply circuit includes an AC voltage controller operable to be controlled by the pulse width modulated signal to provide the motor supply current to the electric motor.

9. The apparatus of claim 8, wherein the AC voltage controller includes a series switch and a commutation switch controllable by the pulse-width modulated signal to provide the motor supply current to the electric motor.

10. The apparatus of claim 9, wherein each of the switches includes two back-to-back series-connected semiconductor switches.

11. An apparatus to balance a vehicle wheel, comprising:

a frame;

a main shaft rotationally mounted to the frame;

an electric motor to drive the main shaft;

a power supply circuit to provide a motor supply current to the electric motor;

a clamping device configured to produce a driving prestressing force to couple the vehicle wheel to the main shaft in a rotationally fixed manner; and an adjustment arrangement operable to adjust the motor supply current provided by the power supply circuit in accordance with a type of the vehicle wheel, wherein the electric motor is a single-phase AC motor; the power supply circuit includes a pulse-width modulation circuit operable to produce a pulse-width modulated signal as a function of the type of the vehicle wheel; and the power supply circuit includes an AC voltage controller operable to be controlled by the pulse width modulated signal to provide the motor supply current to the electric motor, the AC voltage controller including a series switch and a commutation switch controllable by the pulse-width modulated signal to provide the supply current to the electric motor, each of the switches including back-to-back series-connected semiconductor switches, the semiconductor switches including at least one of MOSFET switches and IGBT switches.

* * * * *